April 26, 1960 M. J. LANGERT 2,934,301
ROPE HITCHING DEVICE FOR SCAFFOLDING APPARATUS
Filed Feb. 21, 1955 2 Sheets-Sheet 1

INVENTOR
MATTHEW J. LANGERT
BY Patrick J. Roche
ATTORNEY

April 26, 1960 M. J. LANGERT 2,934,301
ROPE HITCHING DEVICE FOR SCAFFOLDING APPARATUS
Filed Feb. 21, 1955 2 Sheets-Sheet 2

INVENTOR
MATTHEW J. LANGERT
BY Patrick J. Roche
ATTORNEY

2,934,301

ROPE HITCHING DEVICE FOR SCAFFOLDING APPARATUS

Matthew Joseph Langert, Long Island City, N.Y.

Application February 21, 1955, Serial No. 489,666

7 Claims. (Cl. 248—328)

This invention relates to scaffolding apparatus, and more specifically to a device for continuously maintaining a hitch in a rope during the lowering movements of the apparatus as well as during the intervals when the apparatus is at rest in a desired position.

In a well-known type of scaffolding equipment, a hook included in a block and tackle mechanism is disposed in an accommodating ring formed integrally with an uppermost portion of a stirrup for detachably connecting the scaffold platform to the block and tackle mechanism. A hitch introduced by a workman into the free end of a rope provided with the block and tackle mechanism frictionally engages the hook and uppermost portion of the stirrup whereby the stirrup is secured to the block and tackle mechanism during the intervals when the scaffold is at rest in a desired position. In order to lower the scaffold, the workman disengages the hitch and permits the rope to slide on the stirrup until such amount of rope is payed out as to dispose the scaffold in the next succeeding desired position. Because of human failures such, for example, as the formation of an imperfect hitch, sickness, heart failure, the rope slipping out of the workman's hand, losing control of the rope and the like, and/or the slackening of the rope due to the scaffold hitting a ledge, lifting of the scaffold by the wind, or the like, it has happened heretofore that the hitch has been loosened and/or the hook has been inadvertently disengaged from the stirrup whereby one or more workmen standing on the scaffold at the time has been unexpectedly precipitated onto the surface below, resulting in injury to his person and/of the persons and property in the immediate vicinity of the falling scaffolding apparatus.

The present invention contemplates an arrangement in which a hitch made in a rope included in a block and tackle mechanism of a scaffolding apparatus is continuously maintained on the stirrup during the lowering movements of the scaffolding apparatus, as well as in desired positions.

It is a main object of the invention to obviate inadvertent and/or accidental disengagements of a rope hitch in scaffolding apparatus.

It is another object to continuously maintain a rope hitch in position at all times, once it has been formed in preparation for lowering movements of a scaffolding apparatus.

It is a further object to provide a rope hitch in a scaffolding apparatus whereby the undesired effects of human failures tend to be obviated.

It is another object to provide in a scaffolding apparatus a rope hitch which can be expeditiously manipulated during lowering movements of the apparatus.

It is another object to provide in a scaffolding apparatus a rope-hitching device adapted to rotate freely and thereby constitute a winch for enabling an expeditious passing of the rope therearound during lowering movements of the scaffold through relatively long distances with substantially minimum frictional wear on the rope.

It is another object to provide a device for precluding inadvertent and/or accidental disengagements between a block and tackle mechanism and a stirrup during the raising and lowering movements of a scaffolding apparatus.

The present invention, in association with a scaffolding apparatus including a stirrup and a block and tackle operated by a rope having a free end for raising and lowering the stirrup, comprises a triangular member having two inclined legs and a horizontal leg and disposed interiorly of the stirrup in such manner that the respective legs of the triangular member are substantially parallel with the corresponding side of the stirrup. The inclined legs of the triangular member joined together at their uppermost ends are connected by an elongated neck to an uppermost portion of the stirrup in an integral and unitary structure. The free end of the rope for the purpose of forming a hitch therein is passed under the joined ends of the inclined legs of the triangular member, then around the two legs in counter-clockwise directions to constitute substantially one convolution, and finally back under the joined ends of the two inclined legs, and the rope convolutions commencing and terminating on effectively opposite surfaces of the respective legs. Friction of the rope on the triangular member holds the stirrup in fixed desired positions. The free end of the rope is fed around the triangular member to lower the scaffolding apparatus into the next succeeding position, once it has been elevated to its zenith position of elevation.

A modification comprises the free end of the rope applied in several convolutions on the elongated neck to constitute a winch whereby the scaffolding apparatus may be expeditiously lowered through relatively large distances by slipping the rope on the elongated neck.

A further modification comprises an elongated neck connecting the joined legs of the triangular member and an uppermost portion of the stirrup, and including a plurality of ball-bearings on which a rotatable sleeve is mounted to constitute a winch. As least one convolution of rope applied to the rotatable sleeve permits the scaffolding apparatus to be expeditiously lowered relatively large distances while at the same time subjecting the robe substantially to minimum frictional wear.

Another modification concerns a shackle for attaching the lowermost end of the block and tackle to the stirrup thereby tending to preclude inadvertent and/or accidental disengagement therebetween.

A feature of the invention resides on the fact that once the hitch is formed, it remains continuously therein during all lowering operations of the scaffolding apparatus thereby tending to minimize accidents, and is loosened or tightened depending on whether the scaffolding apparatus is being lowered or maintained in a fixed position.

The invention will be readily understood from the following description when taken together with the accompanying drawing in which.

Figure 1:
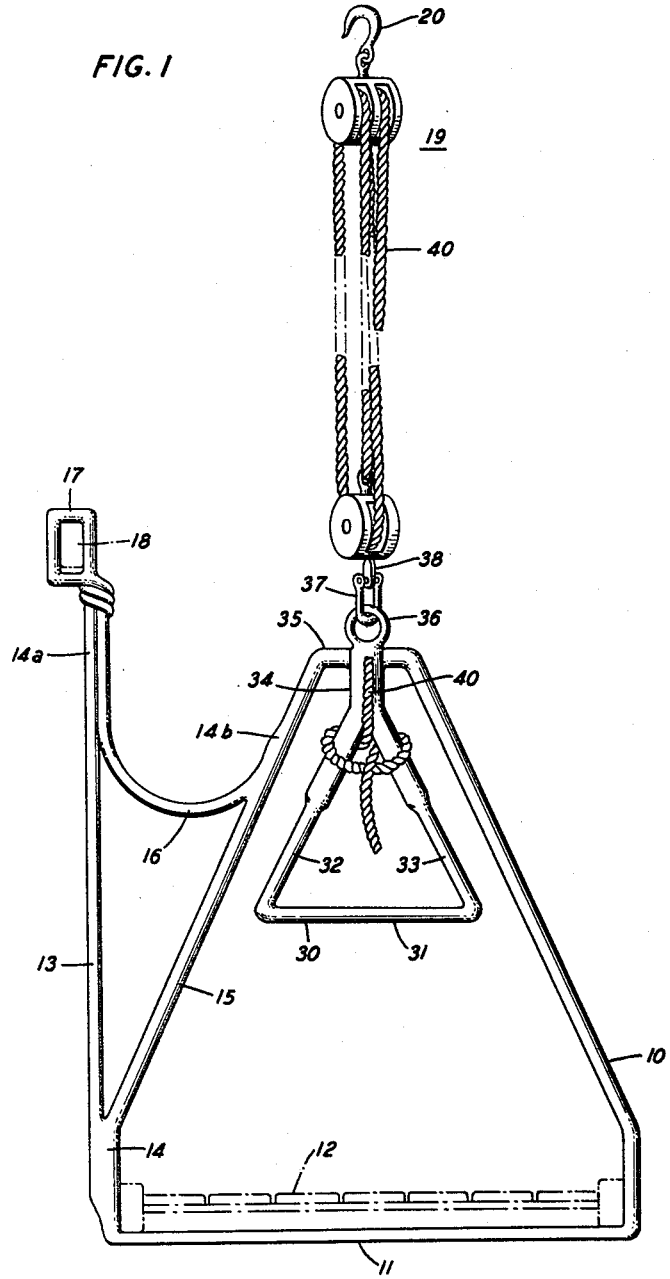
Fig. 1 is an elevational view embodying a specific embodiment of the invention.

Referring to Fig. 1, there is disclosed a well-known scaffolding apparatus comprising a stirrup 10 which includes an integral horizontal leg 11 adapted to support a wooden platform 12. A vertical rod 13 and stirrup side 15 are formed integral at their lowermost end 14. An arcuate bridge 16 connects upper end portions 14a and 14b of both rod 13 and stirrup side 15, respectively. An uppermost end 17 of vertical rod 13 is terminated in a rectangular opening 18 for accommodating an elongated rectangular wooden bar, not shown, which serves as a safety barrier for workmen on the scaffolding apparatus in the well-known manner. A block and tackle device 19 is provided with a hook 20 at its uppermost end for attachment to a point from which the scaffolding apparatus is to be suspended. While the foregoing describes one support for the scaffolding apparatus to simplify the illustration, it will be readily understood that to those skilled in the art that a second such support will be required to constitute a support for both ends of the familiar scaffolding apparatus. Also, it will be understood that the rope of the block and tackle device may be operated to move the scaffolding apparatus to a desired zenith point of elevation, in the well-known manner.

The present invention utilized with the scaffolding apparatus above-described and disclosed in Fig. 1 comprises a unitary triangular member 30 including a horizontal leg 31 and two inclined cylindrical legs 32 and 33 having corresponding lower ends formed integral with the opposite ends of the horizontal leg, and opposite ends joined together and attached to the lowermost end of an elongated neck 34. This neck has its uppermost end formed integral substantially with a midpoint of an uppermost portion 35 of stirrup 10. A ring 36 is formed integral substantially at the junction of stirrup portion 35 and neck 34. The triangular member 30 is so positioned interiorly of the stirrup 10 that the respective legs 31, 32 and 33 are substantially parallel with the corresponding sides of the stirrup. Shackle 37 positioned in ring 36 is also attached to a portion 38 formed integral with the lowermost end of the block and tackle device. This shackle tends to preclude inadvertent and/or accidental disengagements between the block and tackle device and the stirrup as the scaffolding apparatus is lowered from its zenith point of elevation into successively lower positions in the manner that will now be explained.

In the operation of the invention, it will be understood that the scaffolding apparatus is initially pulled up via a hauling line 40 constituting the end of the rope included in each block and tackle device in the well-known manner to a desired zenith point of elevation. In this connection, it will be recalled that while at least two workmen normally occupy the scaffolding apparatus for the purpose of performing a particular piece of work, each workman manipulating the two hauling lines 40 to lower the scaffolding apparatus, it will be understood that it will be possible for one workman on the scaffolding apparatus to manipulate the two hauling lines 40, one at a time, during the lowering operation of the scaffolding apparatus.

Figure 5:
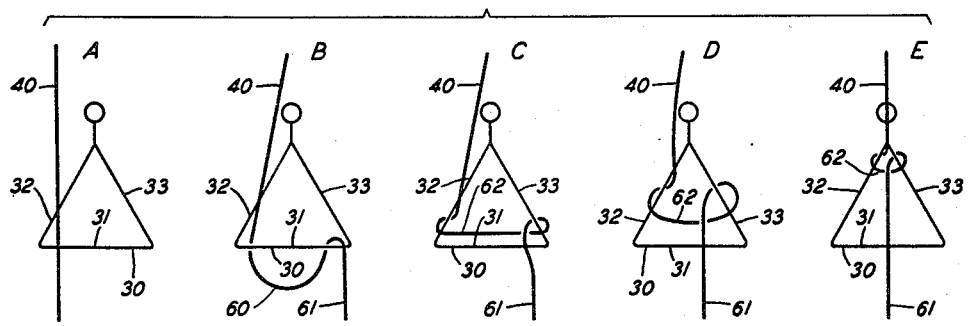
Fig. 5 illustrates the several steps required to produce the hitch disclosed in Fig. 1.

Hauling line 40 of each block and tackle is manipulated by a workman to form a hitch as illustrated in Figs. 1 and 5 in the following manner: At the completion of the afore-mentioned hauling operation during which the scaffolding apparatus is pulled up to the zenith point in preparation for the successive discrete lowering steps, the hauling line 40 initially hangs substantially in a vertical direction from the associated block and tackle devices in front of legs 31, 32 and 33 of triangular member 30, i.e., in front of those legs nearest to the workman, as shown in Fig. 5A. Next, the hauling line 40 is disposed in front of leg 32 and behind leg 31 to constitute loop 60 which extends below the triangular member 30 and which includes so-called "bitter" end 61 hanging over in front of leg 31 as illustrated in Fig. 5B. In the latter figure, it will be seen that the opposite ends of the loop lie in proximity of the lowermost ends of legs 32 and 33.

Then, grasping approximately the center of the loop, the loop ends are brought around the proximate ends of the responsive legs 32 and 33 of the triangular member as delineated in Fig. 5C. Referring to the latter figure, it will be apparent that the hauling line extends under, and around and in front of leg 32 in a counter-clockwise direction to constitute substantially one convolution; then in a section 62 over to and in front of leg 33, and around and to the back of the latter leg in a counter-clockwise direction to constitute substantially one convolution; and finally the so-called "bitter end" 61 passing over and downwardly in front of the near sides of rope section 62 and leg 31.

In Fig. 5C, it will be observed that the rope convolution around leg 32 commences from a point lying approximately therebehind or the far side whereas the rope convolution around leg 33 starts from a point falling substantially in front thereof or the near side, i.e., the two convolutions originate effectively from points lying substantially on opposite surfaces of the respective legs in relation to the position of the workman facing triangular member 30. This tends to provide a relatively large frictional effect for a purpose that will be subsequently mentioned.

Now, the two rope convolutions are permitted to slide along the peripheral surfaces of the respective legs 32 and 33 in an upward direction toward the joined ends thereof as shown in Fig. 5D; and finally come to rest substantially with a large and frictional grip or lock on the legs 32 and 33 and their joined ends as illustrated in Figs. 1 and 5E.

Figure 4:
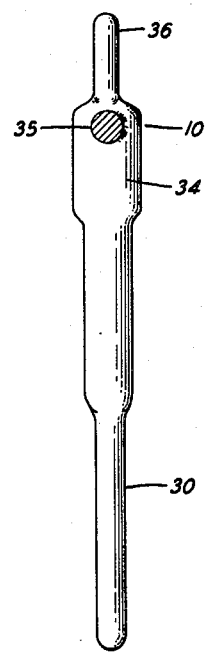

Summarizing the afore-described manipulations of hauling line 40 around the respective legs of triangular member 30: Each hauling line, in the sequential steps shown in Fig. 5, is first passed down in front of and approximately under the joined ends of legs 32 and 33; then from behind and around leg 32 in a counter-clockwise direction to a point in front of the latter leg to such extent as to constitute substantially one rope convolution around the leg; from the last-mentioned point approximately in a rectilinear portion 62 to a point in front of leg 33 and then therearound in a counter-clockwise direction to a point therebehind to such extent as to form substantially one convolution therearound, with the "bitter end" 62 passing over and then downwardly in front of horizontal portion 62 and triangular member 30. Thus, a substantially rectilinear rope portion 62 connects the curvilinear portions passing around the respective legs 32 and 33 of the triangular member 30 to form a hitch which remains fast due to friction to hold the scaffolding apparatus in the desired zenith point of elevation. Fig. 4 shows an end view of the triangular member to which the hauling line is disengageably attached.

When it is desired to drop the scaffolding apparatus to the next desired lower position, the workman loosens hauling line 40 in Fig. 1 and then feeds it around legs 32 and 33 and under the joined ends thereof. This is continued until the scaffolding apparatus assumes the desired next lower position whereupon the workman ceases to feed the hauling rope and allows friction to again hold it fast in position on the triangular member as above explained. This is repeated for the hauling rope at each end of the scaffolding apparatus for as many operations as are necessary to drop the entire scaffolding apparatus in successive steps to desired successively lower positions.

Figure 2:
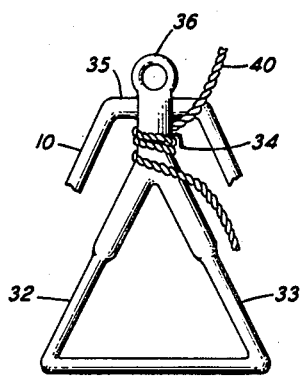
Figs. 2, 3 and 4 are elevational views of modification of Fig. 1.
Figure 3:
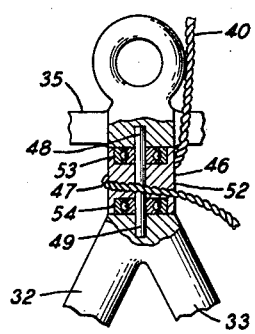

Modifications for adapting neck 34 in Fig. 1 for use as a winch are illustrated in Figs. 2 and 3. As shown in Fig. 2, hauling line 40 may be directly applied in two or more convolutions around neck 34. In Fig. 3, a ball-bearing neck 46 substituted for neck 34 in Figs. 1 and 2 comprises a pin 47 having its uppermost end 48 attached with a drive fit in upper stirrup portion 35, and its lowermost end 49 attached with a driven fit in the joined ends of legs 32 and 33. Secured to pin 47 with a drive fit in spaced relation is a pair of ball bearings 53 and 54 of familiar type. Disposed on the ball bearings is a sleeve 52. As is well-known, the sleeve rotates freely on the ball bearings. The hauling line 40 is applied in at least one convolution around sleeve 52. In Figs. 2 and 3, it will be obvious that the number of convolutions applied to necks 34 and 46 in Figs. 2 and 3, respectively, may be determined to suit given uses of the invention disclosed in Fig. 1.

In the operation of the modification according to Figs. 2 and 3, the hauling line 40 is applied in the preselected number of convolutions to the external periphery of the respective necks 34 and 46 and fed thereto under control of a workman. As the hauling line is payed out by a workman positioned at each block and tackle device included in the scaffolding apparatus the slippage of the hauling line on neck 34 or the rotation of sleeve 52 permits the scaffolding apparatus to drop expeditiously through a relatively long distance substantially with minimum effort on the part of the workmen and minimum frictional wear on the hauling line in Fig. 3.

It will be understood that the invention is disclosed in the specific embodiment herein for the purpose of this description and that it is capable of modification by those skilled in the art, and therefore is to be limited only by the scope of the appended claims.

What is claimed is:

1. In combination with a swinging scaffold including a stirrup comprising a horizontal base and a substantially non-linear element extending upwardly from said base and having opposite ends joined integrally to opposite ends of said base in one plane, said base and non-linear element including an opening therebetween in said one plane, an annular member mounted on an uppermost portion of said non-linear element and projecting upwardly therefrom in said one plane, and a block and tackle detachably connectable to said annular member and including a hauling rope having one end fixedly connected to said block and tackle and the opposite end free for raising and lowering and holding said stirrup in a vertical plane coincident with said one plane, a device for supporting the free end of said rope comprising a neck having one end fastened to said uppermost element portion adjacent said annular member and depending normally from said last-mentioned portion in said opening in said one plane, and a pair of legs so mutually angularly disposed relative to said neck in said opening in said one plane that adjacent ends of said legs are connected to the opposite end of said neck, said legs depending from the opposite end of said neck in said opening in said one plane to constitute with said neck effectively an inverted Y-device depending from said uppermost element portion in said opening in said one plane for permitting said free rope end to engage a portion of the periphery of one of said pair of legs and to terminate in a hitch on substantially the entire periphery of the other of said pair of legs.

2. In combination, a stirrup comprising a horizontal leg and an effectively non-linear leg having its opposite ends joined integrally to opposite ends of said horizontal leg, said non-linear leg projecting upwardly from said horizontal leg in one plane therewith to provide an opening therebetween, a block and tackle including a rope having one end fixedly connected to said block and tackle and the opposite end free for controlling movements of said stirrup in a vertical plane coincident with said one plane, said block and tackle being detachably connectable to an uppermost portion of said non-linear leg, and means for supporting the free end of said rope during the movements of said stirrup in said vertical plane as well as to hold said stirrup in respectively differently preselected positions in said vertical plane, said means comprising a rectilinear neck having one end secured to said uppermost non-linear leg portion and depending normally therefrom in said opening in said one plane, and two rectilinear members so mutually angularly inclined relative to said neck that adjacent ends of said two members are joined integrally to the opposite end of said neck, said two members being further mutually angularly inclined relative to said neck in said opening in said one plane that each of said members forms an obtuse angle with said neck whereby said neck and two members constitute effectively an inverted Y-device depending from said uppermost element portion in said opening in said one plane for enabling said free rope end to engage a portion of the periphery of one of said two members and to terminate in a hitch on substantially the entire periphery of the other of said two members.

3. The combination according to claim 2 which includes a third rectilinear member disposed intermediate said horizontal and non-linear legs in said opening in said one plane, said third member having its opposite ends connected to corresponding opposite ends of said two members to constitute therewith effectively a triangular configuration lying in said opening in said one plane.

4. In combination with a swing scaffold including a stirrup comprising a horizontal leg and an effectively non-linear leg having its opposite ends secured to opposite ends of said horizontal leg, said non-linear leg projecting above said horizontal leg to provide an opening therebetween in a vertical plane, an annular member fastened to an uppermost portion of said non-linear leg and projecting thereabove in said vertical plane, a block and tackle including a hauling rope having one end fixedly connected thereto and the opposite end free, and means for detachably connecting said annular member and thereby said stirrup to said block and tackle for moving and holding said stirrup in said vertical plane by manipulations of said free rope end, means to support said free rope end during said manipulation thereof, comprising two discrete rectilinear members arranged in a mutually angular relationship in said opening in said vertical plane so that adjacent ends of said two members are joined to said uppermost leg portion and further so that said two members depend from said last-mentioned portion in said opening in said vertical plane in a diverging direction to constitute effectively an inverted V-device disposed in said opening in said vertical plane for enabling said free rope end during said manipulations thereof to engage a portion of the periphery of one of said two members and to terminate in a hitch on substantially the entire periphery of the other of said two members.

5. In combination in a scaffold including a stirrup comprising a horizontal leg and an effectively non-linear leg having its opposite ends secured to the opposite ends of said horizontal leg, said non-linear leg projecting above said horizontal leg to provide an opening therebetween in a vertical plane, and a block and tackle connectable to an uppermost portion of said non-linear leg and including a hauling rope having one end fixedly connected to said block and tackle and the opposite end free for controlling movements of said stirrup in said vertical plane above a horizontal plane and holding said stirrup in differently preselected positions in said vertical plane above said horizontal plane, an elongated cylindrical member having one end connected to said uppermost non-linear leg portion and depending normally therefrom in said opening in said vertical plane, said member having said free rope end applied to the periphery thereof in at least one convolution thereby effectively permitting an expeditious paying out of said free rope end thereon to lower said stirrup relatively quickly from one preselected position in said vertical plane above said horizontal plane down to another preselected position in said vertical plane above said last-mentioned horizontal plane.

6. The combination according to claim 5 in which said depending cylindrical member comprises an elongated pin having one end rigidly anchored in said uppermost non-linear leg portion and depending normally therefrom in said opening in said vertical plane, and a hollow sleeve rotatably mounted exteriorly of said pin, said rotatable sleeve having said one convolution of said free rope end applied to the periphery thereof for permitting the expeditious paying out of said last-mentioned rope end thereon.

7. In combination with a stirrup suspendible at different positions in a vertical plane by different lengths of a suspension rope having one end connected to said stirrup and the opposite end free, said stirrup including a horizontal leg and two further legs having corresponding ends connected to opposite ends of said horizontal leg and opposite ends mutually angularly inclined toward each other and joined together, said horizontal and two further legs defining an opening therebetween in one plane disposable in said vertical plane, apparatus positioned in said opening in said one plane and mounted adjacent said joined opposite ends of said two further legs for supporting said free rope end while said stirrup is moved in said vertical plane from one to another of said different positions by different lengths of said suspension rope as well as while said stirrup is fixedly suspended at a preselected one of said different positions in said vertical plane by a predetermined length of said suspension rope, said apparatus comprising two substantially rectilinear members mutually angularly disposed to depend from the joined opposite ends of said two further stirrup legs in said opening in said one plane, said two members having corresponding ends extending in a direction converging on the joined opposite ends of said two further stirrup legs and connected thereto, said two members also having opposite ends extending in a direction diverging from the joined ends of said two further stirrup legs, said two members with said converging and diverging ends constituting said apparatus effectively with an inverted V-shape whereby said free rope end engages a portion of the periphery of one of said last-mentioned two members and terminates in a hitch substantially on the entire periphery of the other thereof during the movements of said stirrup in said vertical plane as well as while said stirrup is fixedly suspended in the preselected position in said vertical plane.

References Cited in the file of this patent

UNITED STATES PATENTS

| | | |
|---|---|---|
| 374,510 | Welch | Dec. 6, 1887 |
| 468,819 | McAnarney | Feb. 16, 1892 |
| 614,621 | Palmer | Nov. 22, 1898 |
| 1,295,669 | Addison | Feb. 25, 1919 |
| 1,430,211 | Bouvy | Sept. 26, 1922 |
| 1,433,024 | Morrison | Oct. 24, 1922 |
| 1,568,285 | Lackner | Jan. 5, 1926 |
| 1,598,367 | Diamond | Aug. 31, 1926 |
| 1,627,558 | Grunwald | May 10, 1927 |
| 2,034,841 | Staggers | Mar. 24, 1936 |
| 2,256,582 | Sorensen | Sept. 23, 1941 |
| 2,450,358 | Romano | Sept. 28, 1948 |